Sept. 8, 1942.　　　　J. HÄFELE　　　　2,295,466

BOLT AND NUT CONNECTION

Filed June 21, 1939

INVENTOR
JOSEPH HÄFELE
BY
Richards & Geier
ATTORNEYS

Patented Sept. 8, 1942

2,295,466

UNITED STATES PATENT OFFICE 2,295,466

BOLT AND NUT CONNECTION

Joseph Häfele, Zurich, Switzerland

Application June 21, 1939, Serial No. 280,248
In Switzerland June 21, 1938

4 Claims. (Cl. 151—29)

This invention relates to a bolt and nut connection.

An object of the present invention is the provision of a bolt and nut connection which is inexpensive in manufacture, easy to operate, and which is so securely constructed that it cannot be loosened accidentally.

Other objects of the present invention will be apparent in the course of the following specification.

The objects of the present invention may be realized through the provision of a plate having a resiliently yielding middle portion provided with an opening the shape of which is fitted to that of the nut or other connecting element screwed upon the bolt and adapted to be held by the spanner or screw wrench. The edges of this opening at least partly enclose the nut. The plate is provided at two sides with parallel ledges or ribs which engage corresponding ledges or ribs of a washer which is securely held against rotation about the axis of the bolt. The engagement of the pairs of ribs is such that the ribs of the plate engage closely those of the washer, thus making it imposible for the plate to separate itself accidentally from the washer.

When the bolt is of the usual form and is provided with a head and a threaded portion carrying the nut, then the head of the bolt may be also secured through the provision of a washer having an opening the outlines of which correspond to those of the head, said washer being secured against rotation about the bolt axis.

The invention will appear more clearly from the following detailed description when taken in connection with the accompanying drawing, showing by way of example preferred embodiments of the inventive idea.

Figure 1:
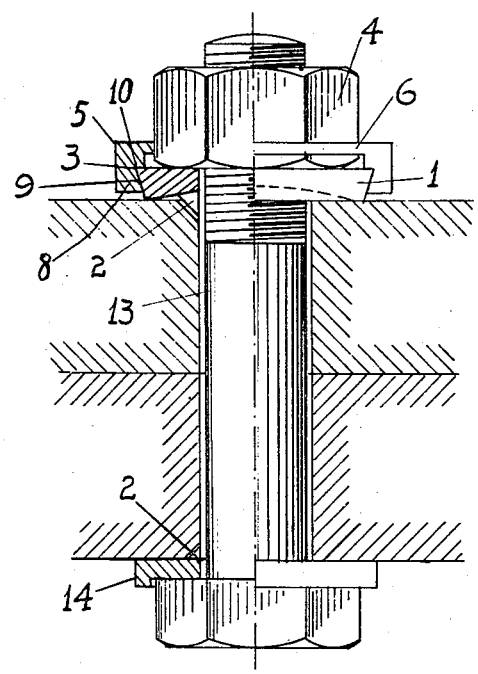
Figure 1 is partly a side elevation and partly a section through a bolt and nut connection constructed in accordance with the principles of the present invention.
Figure 3:
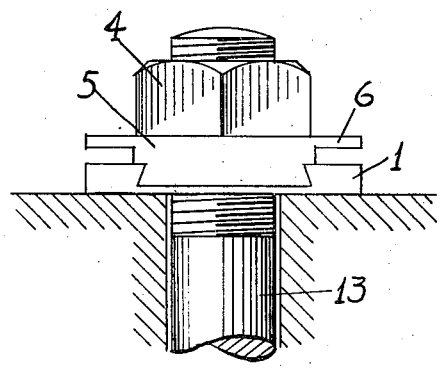
Figure 3 is a side elevation of a portion of the device shown in Figures 1 and 2, and illustrates the device in a position at right angles to the position shown in Figure 1.
Figure 2:
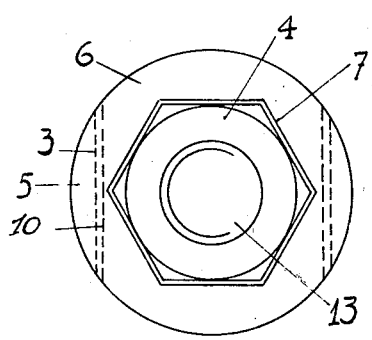
Figure 2 is a top view of the device shown in Figure 1.

The device shown in Figures 1, 2, and 3 of the drawing comprises a washer 1 which encloses a bolt 13 and which carries a nut 4 screwed upon the bolt 13. The lower surface of the washer which engages the part to be held by the bolt 13 and the nut 4, is concave in form. Due to this concavity, the washer is made resilient, so that it permits a turning of the nut 4 until it fits in its screwed position into an opening 7 provided in a plate 6.

The washer 1 is provided with a projection or extension 2 which may have the form of a pyramid and which fits into a corresponding recess provided in the part to be held by the bolt 13 and the nut 4. Thus the washer 1 is secured against rotation about the axis of the bolt 13.

The washer 1 comprises two guiding ribs or edges 3 which extend parallel to each other on opposite sides of the bolt 13. The parallel side surfaces of the washer 1 which are situated adjacent the edges 3 diverge outwardly in the direction toward the nut 4 (Figure 1).

The nut 4 is illustrated as being screwed into a position in which a plane passing through two opposed edges of the nut extends at right angles to the edges 3 of the washer 1.

The plate 5 is provided with a resiliently yieldable middle portion 6 having a central opening the outlines of which correspond to those of the nut 4. The nut 4 extends through the opening 7 and there is small play provided between the edges of the opening 7 and the adjacent surfaces of the nut 4.

The plate 5 is also provided with two ribs 8 extending parallel to each other on opposite sides of the bolt 13. The ribs 8 are provided on the inner part of the plate 5 and have recesses 9 and edges 10 which correspond to the edges 3 of the washer 1, so that the edges 3 fit into the recesses 9 and engage the edges 10 of the plate 5. Due to this arrangement, a firm connection is established between the washer 1 and the plate 5.

The distance of the lower inner edges of the ribs 8 of the plate 5 from each other is somewhat smaller than the distance of the edges 3 of the washer 1 from each other. Due to the resiliency of the middle portion 6, the ribs 8 may be snapped over the edges 3 of the washer 1 in the course of assembly, and thus the nut 4 is completely secured against undesirable loosening.

The bolt 13 with its head is secured against rotation through the provision of a washer 14 having a central opening the outlines of which correspond to those of the head of the bolt 13. A little play is provided between the edges of this opening and the adjacent surfaces of the head of the bolt 13. The head is situated within this opening. The washer 14 is also provided with a projection or key 2 which extends into a corresponding opening formed in the part to be held by the bolt 13 and the nut 4. Due to the provision of the projection 2, the washer 14 is held securely against rotation about the axis of the bolt 13.

Figure 4:
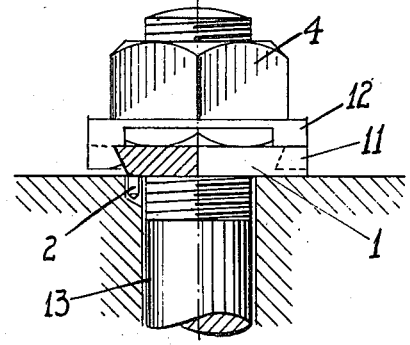
Figure 4 is partly a side elevation and partly a section through a bolt and nut connection of a somewhat different form.
Figure 5:
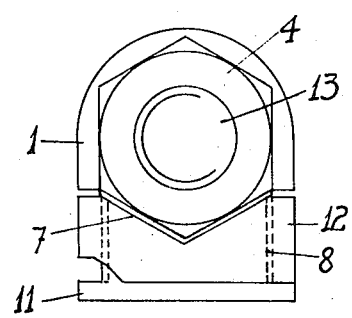
Figure 5 is a top view of the device shown in Figure 4.

Figures 4 and 5 show a bolt 13 carrying a nut 4 and provided with a locking device comprising a washer 11 and a plate 12. This construction is used when the space available for the locking device is comparatively small. The plate 12 is U-shaped in cross-section and is of rectangular or substantially rectangular form. It is provided with a cut-out portion or recess 7 the outlines of which correspond to a part of the outlines of the nut 4. The edges of the recess 7 enclose the nut 4 partly.

The washer 11 is also provided with supports extending on both sides and preventing the plate 12 from moving in a direction away from the axis of the bolt 13.

In this case the lock for the washer 11 consists of a pin or projection 2 which is carried by the washer and which projects into a corresponding bore-hole provided in the part to be held by the bolt 13 and the nut 4.

Obviously, the washers 1 and 11 shown in Figures 1 and 4 can have an inclined supporting surface or a supporting surface of any other form, for instance, in order to facilitate the attachment of the bolts to angle-irons and the like.

In general, the above described structures are subject to wide variation and modification without departing from the scope or intent of the invention, all of which variations and modifications are to be included within the scope of the present invention.

What is claimed is:

1. A washer adapted to be carried by a bolt and having means projecting into the work which is held by said bolt and by a nut screwed upon said bolt, for locking the washer against rotation relatively to the work, in combination with a nut-locking substantially resilient plate having an opening formed therein, the outlines of said opening at least partly corresponding to the outer surfaces of said nut, said plate having two ribs extending parallel to each other and recesses formed in said ribs and extending opposite each other, said washer having parallel edges for fitting into said recesses when the plate is snapped over the washer after the washer is firmly seated in position.

2. A washer adapted to be carried by a bolt and having means projecting into the work which is held by said bolt and by a nut screwed upon said bolt, for locking the washer against rotation relatively to the work, in combination with a nut-locking disc-shaped substantially resilient plate having a central opening formed therein and having edges adapted to enclose the outer surfaces of said nut, said edges corresponding to said outer surfaces, said nut fitting into said opening with small play, said plate having two dependent ribs extending parallel to each other and recesses formed in said ribs and extending opposite each other, said washer having parallel edges for fitting into said recesses when the plate is snapped over the washer after the washer is firmly seated in position.

3. A washer adapted to be carried by a bolt and having means projecting into the work which is held by said bolt and by a nut screwed upon said bolt, for locking the washer against rotation relatively to the work, in combination with a nut-locking substantially resilient plate having an opening formed therein, the outlines of said opening at least partly corresponding to the outer surfaces of said nut, said plate having two ribs extending parallel to each other and recesses formed in said ribs and extending opposite each other, said washer contacting said nut and having a concave underlying surface and also having parallel edges for fitting into said recesses when the plate is snapped over the washer after the washer is firmly seated in position.

4. A washer adapted to be carried by a bolt and having means projecting into the work which is held by said bolt and by a nut screwed upon said bolt, for locking the washer against rotation relatively to the work, in combination with a nut-locking substantially rectangular and resilient plate having an opening formed therein, the outlines of said opening partly corresponding to the outer surfaces of said nut, the edges of said opening enclosing a part of said outer surfaces of the nut with small play, said plate having two ribs extending parallel to each other and recesses formed in said ribs and extending opposite each other, said washer having parallel edges for fitting into said recesses when the plate is snapped over the washer after the washer is firmly seated in position.

JOSEPH HÄFELE.